United States Patent [19]

Seelye

[11] 4,041,124
[45] Aug. 9, 1977

[54] METHOD IMPROVEMENTS IN REMOVING ARTICLES FROM WHEEL BLOW MOLDING MACHINES

[75] Inventor: John F. Seelye, Thomaston, Conn.

[73] Assignee: Monsanto Company, St. Louis, Mo.

[21] Appl. No.: 576,559

[22] Filed: May 12, 1975

[51] Int. Cl.² .................................................. B29C 17/07
[52] U.S. Cl. ...................................... 264/336; 198/471;
198/633; 198/577; 198/411; 198/415; 264/99;
425/537; 425/540
[58] Field of Search ................. 264/89, 94, 96, 98,
264/99, 334, 335, 336; 425/326 B, 436, 437,
444, DIG. 232; 198/34 A, 76, 22 R, 22 B, 29,
279, 280, 281, 283

[56] References Cited

U.S. PATENT DOCUMENTS

| 2,604,200 | 7/1952 | Hohl et al. | 198/402 |
| 2,730,226 | 1/1956 | Day et al. | 198/34 A |
| 2,925,165 | 2/1960 | Rake | 198/688 |
| 3,025,561 | 3/1962 | Ruekberg et al. | 425/387 R |
| 3,307,678 | 3/1967 | McCollough | 198/380 |
| 3,310,834 | 3/1967 | Simpson et al. | 425/152 |
| 3,425,530 | 2/1969 | Carter | 198/396 |
| 3,495,291 | 2/1970 | Copping et al. | 198/280 X |
| 3,595,251 | 7/1971 | Tarantola | 134/65 |
| 3,785,473 | 1/1974 | Cook | 198/402 |

*Primary Examiner*—Jan H. Silbaugh
*Attorney, Agent, or Firm*—Michael J. Murphy

[57] ABSTRACT

In removing articles from a wheel-type blow molding machine continuously revolving in a vertical plane with multiple mold sections opening radially to the wheel axis out of which the articles are ejected sidewise downwardly onto a takeaway pocket conveyor.

A process involving positioning the articles in the pockets such that the moils protrude laterally of the conveyor, capturing such moils within a spiral screw channel while still advancing within the pockets, then pivoting such captured articles downwardly to a vertical attitute beyond the conveyor by means of the screw and forward twisting contour of a guide rail.

10 Claims, 8 Drawing Figures

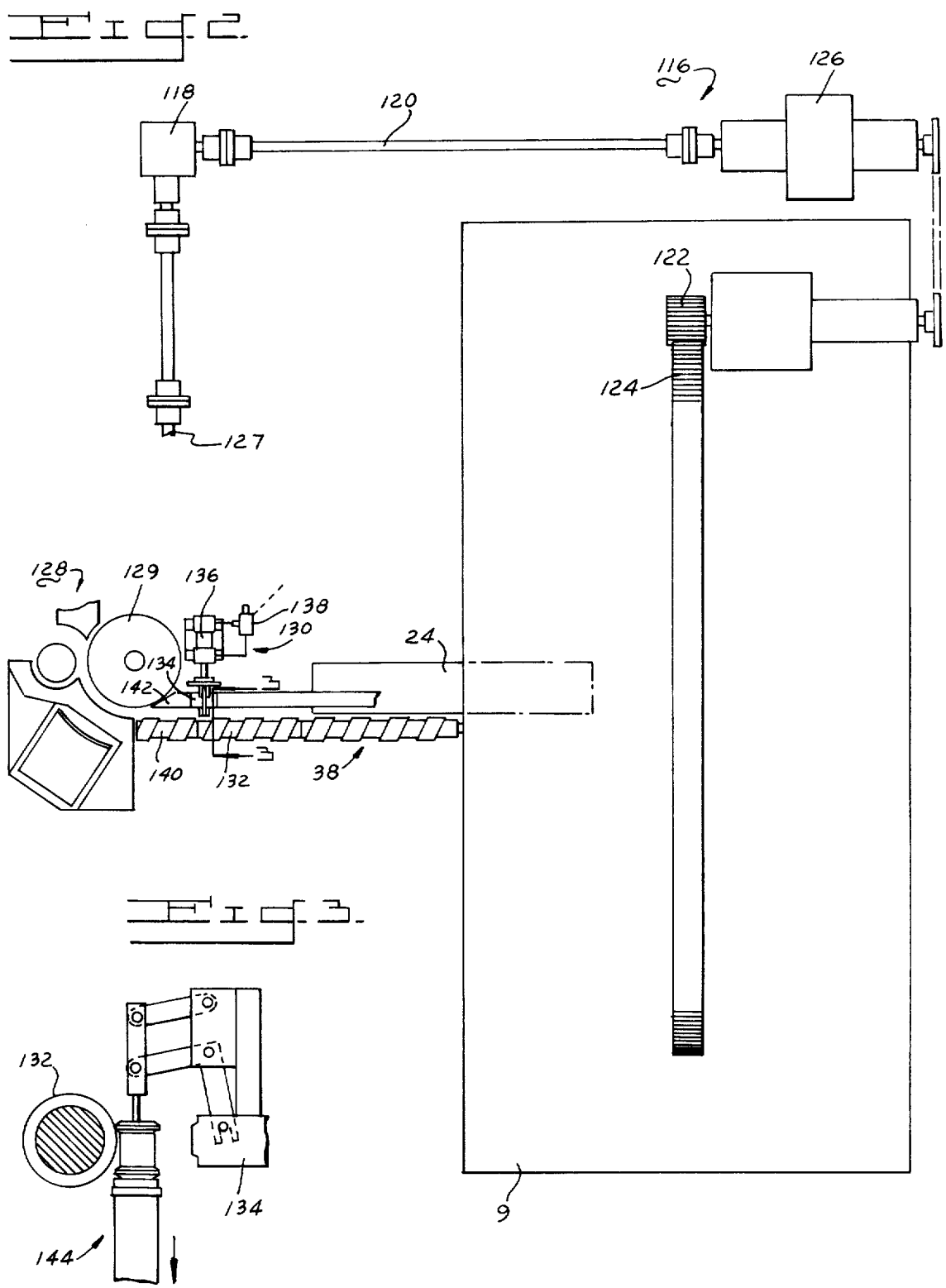

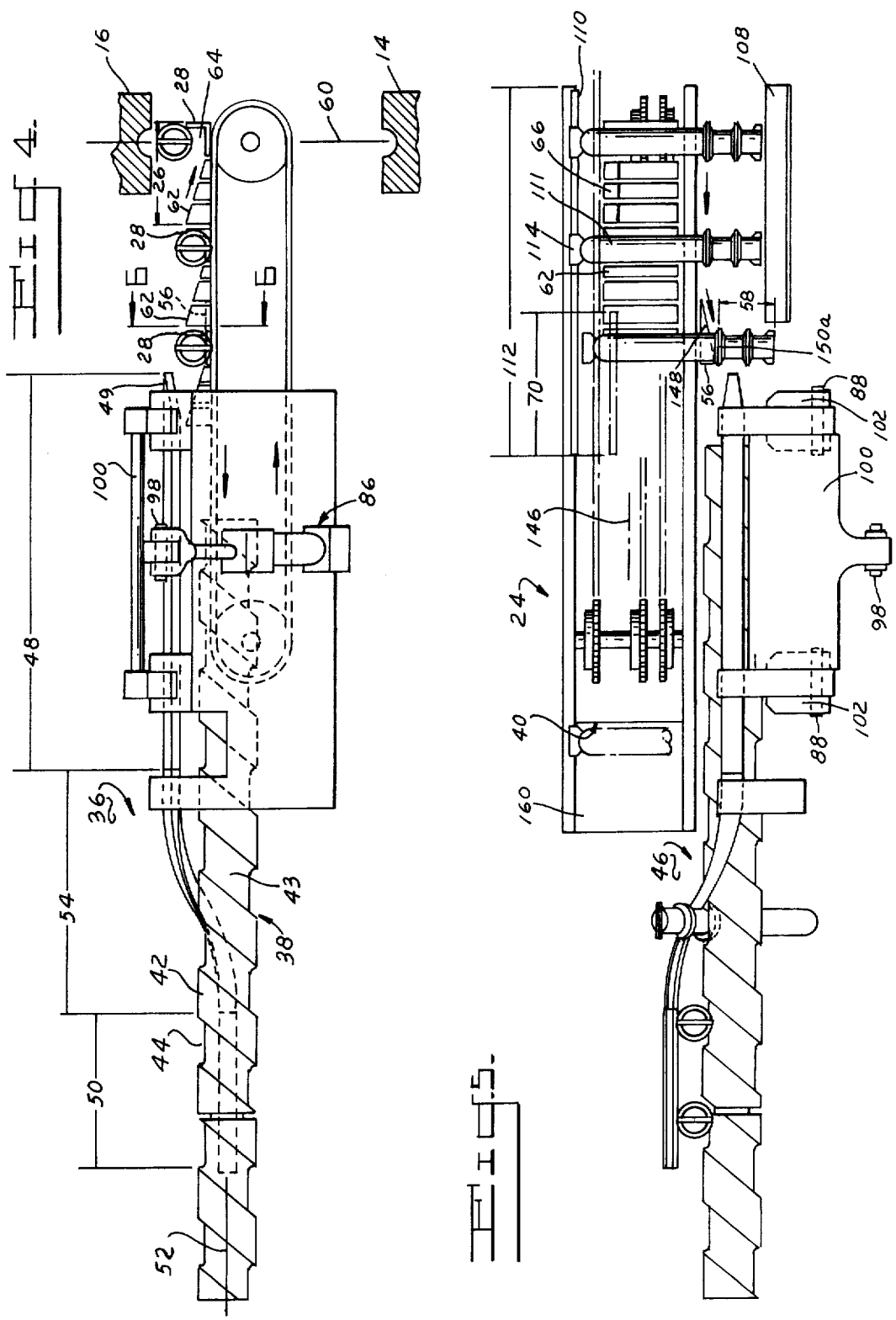

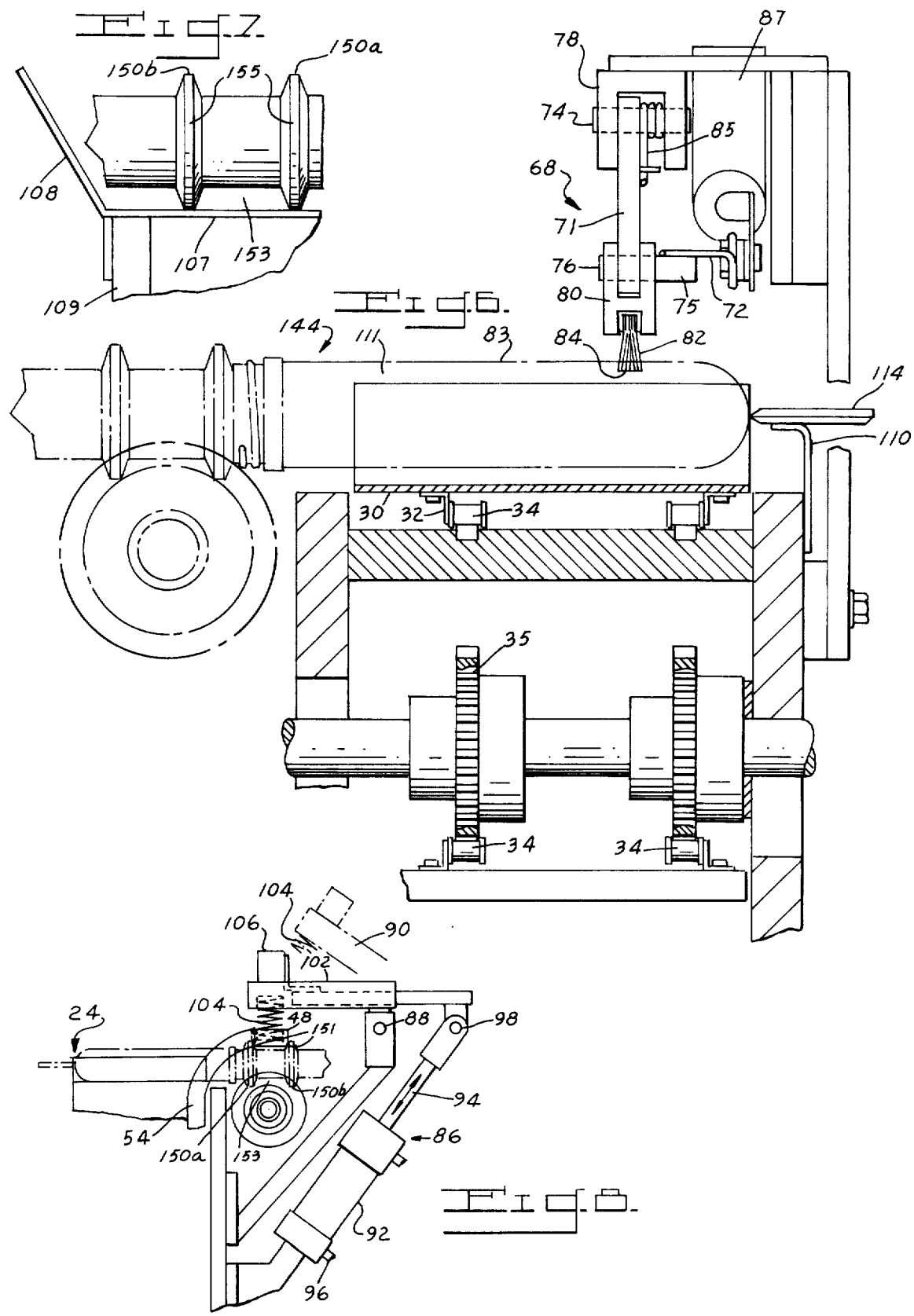

METHOD IMPROVEMENTS IN REMOVING ARTICLES FROM WHEEL BLOW MOLDING MACHINES

CROSS REFERENCE TO RELATED, COMMONLY OWNED APPLICATIONS

A. Ser. No. 467,378, filed May 6, 1974, now U.S. Pat. No. 3,894,454

B. Ser. No. 472,638, filed May 23, 1974, now U.S. Pat. No. 3,949,628

C. Ser. No. 550,537, filed Feb. 18, 1975

BACKGROUND OF THE INVENTION

This invention relates to plural plastic article shaping, and more particularly to handling such articles in a continuous manner on being sequentially released from the mold shaping surface.

Blow molding machines of the type consisting of a wheel mounted for rotation in a vertical plane having a plurality of molds about the wheel periphery are known in the art, e.g. U.S. Pat. No. 2,784,452. With this version of wheel machine, each mold station includes inner and outer mold sections and a hollow needle which enters the mold cavity after closing to puncture the wall of an enclosed pliable parison and expand it to form the article. At a preselected area along the path of mold travel, each outer section, with the article held therein, is drawn fully away from its inner section radially to the wheel axis, whereupon at an appropriate time it is ejected downwardly in the plane of wheel rotation.

Such a system possesses many molding advantages, but has presented problems from the standpoint of a reliable, troublefree system for maintaining positive control of the continuously ejected articles while moving them away from the machine, especially at high throughput rates. More specifically, space adjacent the wheel for locating take away components is at a premium because of system geometry. Conveyors cannot be in the plane of the wheel tangent to eject as with other types of wheel-molding systems, because each outer section in closing moves radially to the axis down through the plane where such a conveyor would be.

If it is elected to eject the molded parts while at elevated temperature before the plastic is well set in order, for example, to facilitate downstream deflashing, as described in commonly assigned applications A. and C. above, space must be maintained between adjacent articles or else they will stick together on touching and, as therein disclosed, a screw conveyor advancing articles while in a vertical attitude represents a viable approach toward such separation. Also, equal spacing between consecutive articles may be desirable to maintain timing with similarly spaced downstream stations for further processing the parts. Moreover, as mentioned in commonly assigned application B. above, it may be advantageous to provide for continued operation of one section of a continuous forming line while another portion is down for a reason inapplicable to the former, and this is especially true with respect to continuing to run rather massive wheel blow-molding machines of the type previously described.

An approach practiced in the prior art involves a pocket conveyor moving at 90 degrees to the plane of wheel rotation which in conjunction with additional differently oriented downstream conveyors, eventually present the articles to the next processing station. With such a system, however, it has proven difficult to accomplish one or more of the objectives, supra.

SUMMARY OF THE INVENTION

Now, however, method improvements have been developed for substantially trouble-free and reliable handling of plastic articles ejected from radially operating molds of a vertically oriented wheeltype blowmolding machine.

Accordingly, it is a principal object of this invention to provide method improvements for receiving articles from outer sections of blow molds of such a machine and removing them in a continuous manner to a downstream station while maintaining positive control of each article at all times.

Another object is to provide method improvements for use with machines of the aforementioned type, which change the position of orientation of the articles during removal from the machine.

An additional object is to provide a cooperating transfer system between the eject station of a wheel machine of the aforementioned type and a downstream screw conveyor.

A specific object is to provide method improvements in a takeaway system to accommodate articles ejected at elevated temperature from machines of the aforementioned type which ensure a definite spacing between successive parts.

A further specific object is to provide method improvements in a takeaway system for use with machines of the aforementioned type which accommodate high wheel eject rates and compensate for wheel operating variables affecting parts ejection from the machine.

Other objects will in part be obvious and will in part appear hereinafter from the following descriptions and claims.

These and other objects are accomplished in blow molding apparatus comprising a wheel arranged for rotation in a substantially vertical plane, plural molds carried with the wheel having outer sections substantially radially movable with respect to the wheel axis to open the molds, eject means for releasing articles from the molds, and a pocket conveyor for the released articles having an upper reach movable away from such plane, by providing the improvement therein comprising, in combination, article turning means adjacent the conveyor including a screw rotating in synchronism with the pockets and cam means between the conveyor and article turning means for urging end portions of the articles into the article turning means.

From a process standpoint, there is provided in a method of removing blow molded thermoplastic articles from a vertically disposed wheel blow molding machine having continuously revolving mold sections containing such articles sequentially moving radially away from the wheel axis during mold opening, which method includes ejecting such articles transversely downwardly out of the mold sections in a direction substantially along the plane of rotation of the sections to pockets of a take-away conveyor, the improvements in such method comprising, in combination, the steps of positioning the articles in the conveyor pockets such that an end portion protrudes laterally of one side thereof, capturing such end portions within a spiral channel of a rotating screw while the articles advance with the pockets of the moving conveyor, and then turning such captured articles sequentially downwardly to a substantially vertical position beyond the end of the conveyor by means of such rotating screw and contour of a cooperating guide rail.

BRIEF DESCRIPTION OF THE DRAWINGS

In describing the overall invention, reference will be made to the accompanying drawings wherein:

FIG. 2 is a partial, schematic, plan view of a drive system for the apparatus of FIG. 1, and including an additional downstream station;

FIG. 3 is a sectional view along 3—3 of FIG. 2 including the article being processed;

FIG. 4 is a side elevational view in greater detail of the takeaway system of FIG. 1;

FIG. 5 is a plan view of substantially the apparatus of FIG. 4;

FIG. 6 is a sectional view along 6—6 of FIG. 4;

FIG. 7 is a fragmentary, elevational view illustrating the article entering the take-away system of FIG. 1; and FIG. 8 is an enlarged, elevational view of a portion of the takeaway system of FIG. 1;

DETAILED DESCRIPTION OF ILLUSTRATED EMBODIMENTS

Figure 1:
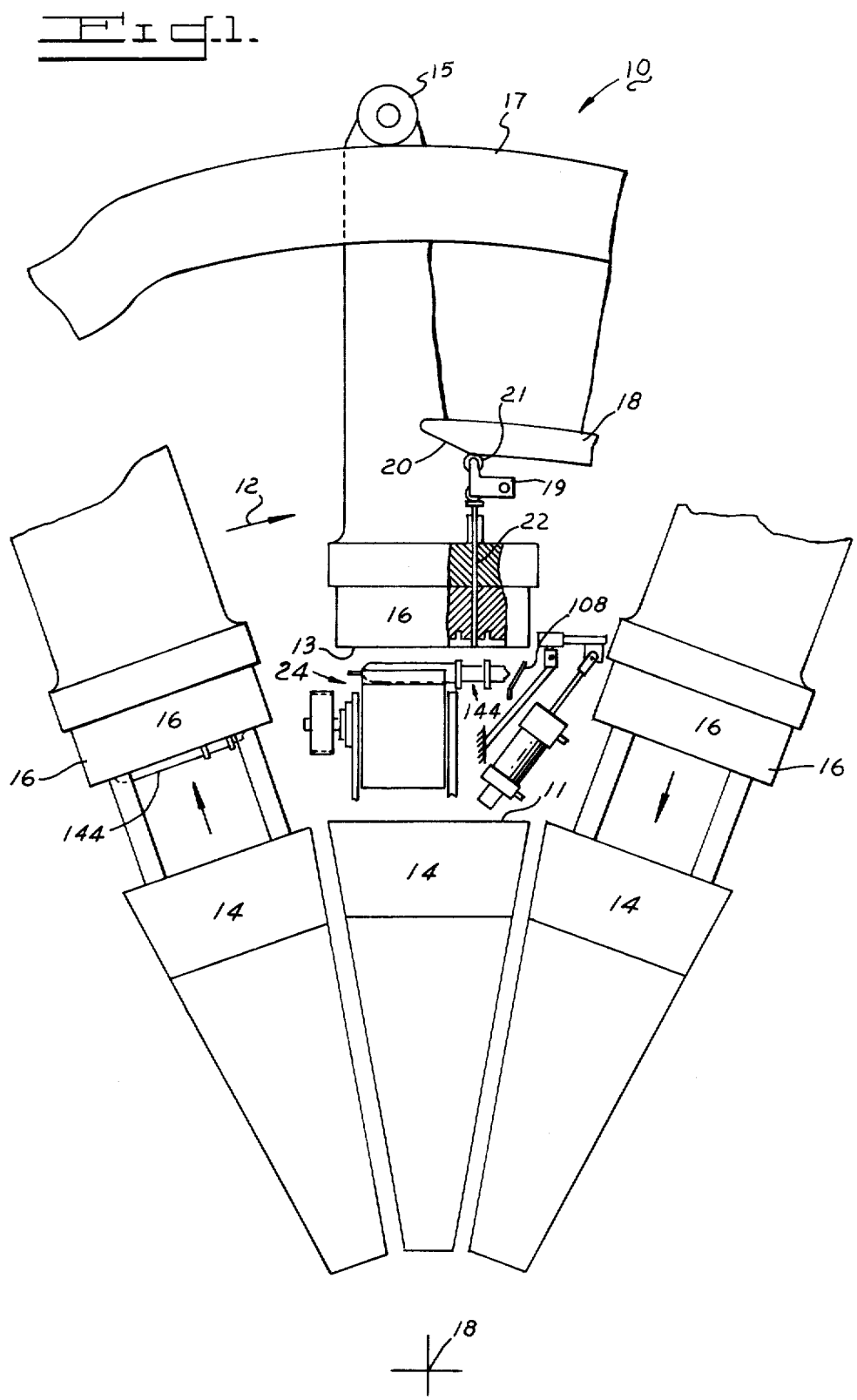
FIG. 1 is a schematic, partial, front elevational view showing a wheel blow-molding machine and take-away system components according to the invention.

In describing the overall invention, reference will be made to the accompanying drawings wherein blow molding apparatus is generally indicated as 10 in FIG. 1 and comprises a known wheel structure, shown in block form at 9 in FIG. 2, arranged for continuous rotation in a vertical plane in the direction of arrow 12, and which includes a plurality of adjacent molds carried with and circumferentially disposed around the full periphery of the wheel, with only three shown for clarity. Each mold includes an inner 14 and outer 16 section having cavity portions (not shown) formed in opposing faces 11 and 13 which together circumscribe the article shape molded therein. In the form of wheel machine with which this invention is especially suited for use, each outer section 16 moves radially toward its inner section 14 and wheel axis 18 from a separated, fully open position during closing, as schematically indicated by the mold on the right of the vertical in FIG. 1, and after rotating continuously through a circular path extending below axis 18, moves radially away from such inner section 14 as indicated by the mold on the left of the vertical in FIG. 1. Follower 15 for each mold and cooperating cam 17 are responsible for such radial movement. At substantially the vertical 12 o'clock position when viewing the system as in FIG. 1, each mold is fully open and this represents the localized area of the circumferential path of mold movement where article ejection occurs.

Eject means associated with outer sections 16 release the articles from such outer sections and comprise fixed cam 18 contoured downwardly at 20 to urge rearwardly biased knockout rod 22 forward into the cavity portion in section 16. Each article 144 is retained in an outer section 16 during mold opening by means, for example, of a keeper-type of undercut in a surface portion of the section cavity, not shown, but known to those skilled in the art, as disclosed in U.S. Pat. No. 3,025,061, which also provides further details of the form of blow molding machine system here being described.

An endless, over and under conveyor 24 (FIG. 5) in receiving relationship with wheel 9 (FIG. 2) has an article-receiving end (FIG. 4) within the plane 60 of rotation and between the separated sections of the molds at the 12 o'clock eject position (FIG. 1). Upright partitions 28, spaced from each other along the entire length of conveyor 24, define a series of pockets, which may vary in length and width from that shown, with one such pocket 26 extant between each pair of adjacent partitions 28 (FIG. 4). The upper reach of conveyor 24, i.e., that progressing to the left away from the molds in FIG. 4, moves at substantially 90° to the plane 60 of wheel rotation. Conveyor 24 may vary in structural detail from that shown and in the illustrated embodiment includes a series of transverse plates 30 (FIG. 6), each secured at two places via clips 32 to supported endless chains 34 continuously driven by conventional means such as shaft-mounted sprockets 35, transmission chains and associated gearing and electric motor, not shown.

In accordance with the invention, turning means (FIG. 4), collectively identified as 36, is laterally adjacent one side of conveyor 24 and includes a member such as a journaled, driven screw 38 moving in synchronism with pockets 26 for linearly and rotatably advancing articles 144 beyond conveyor 24. Means 36 extends forwardly and rearwardly of delivery end 40 of conveyor 24 which is furthest from plane 60. Screw 38 has flight portions 42, which may, for example, increase in pitch in the direction of movement of the upper reach of conveyor 24, and which form, with barrel 43, a continuous spiral channel 44 having a width and depth adapted to receive end portions of articles 144 therein. In this respect, the pitch of screw 38 along the portion closest plane 60 is preferably substantially equal to the length of a pocket 26 in the direction of conveyor movement in order to facilitate entry of the article end portion into channel 44 in a manner to be described. Synchronism of pockets 26 and screw 38 is obtained by initially manually manipulating the screw 38 until a portion of channel 44 (as opposed to flight 42) is opposite the rearmost end of a pocket 26 and thereafter setting or timing the drive for the conveyor and screw such that a fixed ratio of screw rovolution to linear conveyor speed exists, e.g., one screw revolution for a pocket length.

Guide means (FIG. 5), generally indicated as 46, of article turning means 36 extends along and cooperates with screw 38 to capture with such screw the article end portions therebetween. Guide means 46 comprises a holding and guiding rail having a pivoted, segmented, jam-resistant, rear section 48 overlying screw 38, a forward section 50 laterally beside screw 38 beyond conveyor delivery end 40 extending substantially parallel to screw axis 52 plus an intermediate turning portion 54 connecting sections 48 and 50.

Cam means between conveyor 24 and article turning means 36 comprises a flat plow guide 56 immediately rearward of and on the same side of conveyor 24 as lead-in 49 of rail section 48, for urging into means 36 each article end section which, in the embodiment shown, comprises waste moil portion 58.

Especially when articles 144 are circular in cross section, pockets 26 of conveyor 24 preferably include (FIG. 4) means decreasing the depth thereof in a direction opposite that of forward movement of the upper reach of conveyor 24, i.e., in the direction toward plane 60 of the blow molding wheel. Such means, in the illustrated embodiment, comprise transversely extending, rigid, bounce-resistant cleats 62 smoothly, successively decreasing in vertical contour toward nest area 64 at the back of each pocket. As illustrated in FIG. 5, cleats 62 may be cut away vertically as at 66 along a portion of their transverse length for a purpose to be described.

Bar assembly 68 (FIGS. 5 and 6) is immediately above pockets 26 along a portion of the length of conveyor 24 indicated in FIG. 5 as 70, and includes detection means comprising probe 72 associated with conventional micro switch 87 for actuating segmented rear rail section 48 of turning means 36 via actuator 86. Assembly 68, in the illustrated embodiment, is pivotable in the forward direction of conveyor movement and includes (FIG. 6) a pair of spaced, parallel, vertical arms 71 (only one being shown), each pivoted, at 74 at its upper end to fixed bracket 78 and having elongated bar 80 pinned at 76 to its lower end. Bar 80 rigidly carries a force-responsive brush 82 having resilient bristles, with the entire assembly being vertically adjustably arranged such that face 84 of brush 82 preferably lie just in the way of sidewall 83 of article 144 in a pocket 26. Thus, with one article properly positioned in a pocket as shown in FIG. 6, contact will be such that the assembly, under the restraining influence of recoil spring 85, pivots only slightly in the direction of conveying movement of the upper reach - i.e. not sufficient to actuate switch 87.

Linear actuating mechanism 86 (FIGS. 4 and 8) is operatively secured to segmented rail section 48 of the turning means so as to automatically move the latter upwardly about pivots 88 to the position shown in outline form at 90 in response to a signal received on actuation of probe 72 of switch 87 of assembly 68 via striking contact with extension 75 of pin 76 when bar 80 of the assembly pivots beyond a preset extent. In the illustrated embodiment, mechanism 86 comprises a conventional cylinder 92 within which a piston connected to rod 94 is reciprocable on receipt of a suitable conventional fluid pressure signal. Rod 94 is pivotally secured at 98 to bracket 100 which in turn carries arms 102 pivoted at 88 in two places to a fixed support.

Rear section 48 of guide means 36 may also be vertically yieldably mounted by a pair of compression springs 104 (FIG. 8) situated in cavities in the forward ends of arms 102 such that on upward movement of rail portion 48 by a predetermined amount in opposition to springs 104, switch means 106 is automatically actuated to trigger mechanism 86 to pivot rail portion 48 upwardly to position 90 in the same manner as caused by brush assembly 68. Manual movement of section 48 is likewise contemplated, if desired.

Outwardly canted stop plate 108 (FIGS. 1 and 7) may be located along a portion of the length of conveyor 24 adjacent its receiving end to act as an abutment for the forward end of moil 58 as it terminates its free fall out of mold section 16. An article tail section support such as right angle clip 110 (FIG. 6) may be located on the other side of conveyor 24 preferably from the extreme right hand end in FIG. 5 adjacent plane 60 to about the start of screw 38 or through distance 112 (FIG. 5) in order to support tail section 114 and keep it from drooping while the article 144 is in a transverse position in a conveyor pocket, as illustrated in FIGS. 5 and 6. Such support immediately after ejection from the mold while the joint between tail 114 and body 111 is setting facilitates later tail removal. After the article is snugly engaged and rotating with turning means 36, support 110 is no longer necessary.

Turning now to FIG. 2, exemplary power means, preferably of a mechanical nature and generally indicated at 116, synchronously drives blow molding wheel 9, conveyor 24 and screw 38 together. In other words, whenever wheel 9 is revolving, conveyor 24 and screw 30 will likewise be moving. Power means 116 includes input pinion 122 rotatable with wheel bull gear 124 plus conventional gear boxes, such as 118, drive shafts 120, pillow blocks, etc., all well known in the art. Phase variator 126 of commercial form is provided in the drive train as an important part of such power means in order to selectively vary the relationship between the movement of the wheel and the conveyor-screw combination, and more particularly to facilitate fine-tube positioning of a pocket 26 with respect to a just-ejected falling article 144. Shaft end 127 is coupled to conventional means (not shown) for imparting movement to the conveyor-screw combination.

Driven article handling means such as a detailer, star wheel turning mechanism, reshaping system or the like, generally indicated in FIG. 2 at 128, are beyond screw 38 for receiving articles from the latter directly or from an extension thereof, preferably while such articles are in a vertical position, in order to perform a turning or other secondary operation on articles 144. Article dump means 130 is immediately upstream of means 128 and comprises a rotary screw portion 132 and opposing, vertically fixed, horizontally shiftable bar 134 (FIG. 3). Means 130 comprises a conventional linear piston-cylinder actuator 136 (FIG. 2) and solenoid 138 associated with a source of fluid pressure to automatically actuate dump means 130 on deactivation of driven handling means 128. Dump means 130 may also be manually operable instead of or in addition to such automatic activation. Longitudinally rotatable second screw portion 140 (FIG. 2) and adjacent guide rail portion 142 are between dump means 130 and driven handling means 128, such screw portion 140 being rotatably associated with the drive for means 128 (not shown). In other words the rotative power for screw portions 132 and 140 are separate, the latter coming off the drive train for means 128.

In operation, continuously revolving outer mold sections 16 carrying a molded article 144 sequentially move radially away from wheel axis 18 and out of contact with matching inner sections 14 as they approach the article-eject position at the 12 o'clock orbital location of FIG. 1 during the mold opening portion of the cycle. Though the size and contour of article 144 may vary within wide limits, in the illustrated embodiment it is circular in cross section along unwanted moil 58 and body 111, tail portion 114 being planar. The plastic of elongated body portion 111 may at this point be substantially set because of prior contact with conventional well-cooled surfaces of the mold-forming cavity as in situations where no further working of such plastic is contemplated, or alternatively, it may be at an overall elevated temperature above ambient and therefore in a dimensionally stable yet pliant condition susceptible to substantial surface deformation on striking.

As each such outer mold section passes by eject cam 18, rod 22, protruding from the rear of a section 16 and in contact with follower mechanism 19 carried with the revolving support for each such section 16, is urged forward toward axis 18 by cam contour 20 and cooperating roller 21 to force molded article 144 downwardly in an orbital direction substantially along the plane of rotation 60 (FIG. 4) of the mold sections toward the gravity-receiving end of conveyor 24. Orientation of an article 144, including tail 114, during ejection is transverse, or in other words, such that its longitudinal axis is generally parallel with the plane of separation of the mold sections. Conveyor 24 is located horizontally (FIG. 1) with respect to the orbital interval of engagement of rod 22 and cam 18 such that each article 144 falls by gravity transversely into a conveyor pocket 26 with its integral moil portion 59 overhanging the right side of conveyor 24 (FIG. 1). Though the embodiment depicts the preferred arrangement of one article per pocket, obviously more than one could be deposited therein during ejection as desired. As illustrated in FIG. 7, at the end of the article free fall, moil 58 may strike stop plate 108 and dead plate 107 locally supported from clip 109, after which the article, depending on the nature of the plastic, may bounce angularly back a ways such that at this point it may not really be stabilized or accurately positioned in the sense of resting against a partition 28 in nest 64 at the rear of a pocket 26 along the full length thereof, as illustrated in FIG. 4, but rather may be cocked sidewise in such pocket or even rolling rearwardly down sloped cleats 62.

Continuous forward movement of the upper reach of conveyor 24 to the left in FIG. 4 carries each article, seriatim, for a short, rotation stabilizing distance before reaching article turning means 36 during which any rolling of the part in the pocket is allowed to terminate via abutment against a partition 28 and any straightening in the pocket, as may be necessary occurs via bar assembly 68 (FIG. 6). In this last connection, as any imprecisely oriented articles pass beneath assembly 68, brush 82, which is located on the upper side, (FIG. 5) of the horizontal center line 146 of conveyor 24 in the elongated area schematically identified as 70, will gently urge the rear portion of article body 111 down into nest area 64 during or shortly before the moil-guiding action of plow 56. In other words, brush 82 insures that the rear portion of body 111 is accurately positioned in the pocket perpendicular to center line 146 during the period of article stabilization, and will also, because of frictional contact with the part, partially turn it in the pocket to bring tail portion 114 to the horizontal position of FIG. 6 and into supportive contact with clip 110, if it is not already in such a position. Brush 82 also helps to prevent one article from rolling out of its pocket into the next adjacent one under the influence of the forward movement of the conveyor. Resilient bristles 82 avoid scratching the surface of the article during such repositioning whenever this is a consideration because of the nature of the plastic. The roll-back and straightening functions of cleats 62 and bar assembly 68 respectively, or their equivalent, insure that each article 144 is in a very definite physical location in the nest portion of its pocket 26 before arriving at the entry end of screw 38 which is operating in phase with passing nest portions 64 of pockets 26, else if it is not in such location, a jam can more than likely be expected.

As each lower circular ring 150a (FIGS. 5 and 7) of integral moil 58 slides outwardly along sloped surface 148 of plow guide 56, the article is drawn out of the pocket toward lead-in portion 49 of rail section 48. Continued successive linear advancement of the article under the influence of the advancing movement of conveyor 24 with which the rear section of the article is still in contact, results in positive guidance of end or moil portion 58 into a position between channel 44 of screw 38 and guide rail portion 48, as illustrated in FIG. 8. Such rail throughout its length has tapered surfaces 151 and a cross sectional thickness designed to successively snugly occupy annular recess 153 between rings 150a and 150b on one side of moil section 58 while at any given instant on the other side of the moil, flat land portions 155 (FIG. 7), of rings 150 will be in rolling engagement with the upright sides of helical channel 44 of screw 38. In this manner, moil 58 is captured between the two components while the articles 144 advance within pockets 26 of conveyor 24. Further horizontal movement causes the thus engaged part to rotate about its lengthwise axis since frictionally in contact with the surface of advancing channel 44 and the opposite rail 112. During such movement, the linear advancing velocity of the engaged article 144 may be gradually increased via a change in screw pitch such that it eventually exceeds the velocity of the pocket from which it was extracted at about the point when it is opposite delivery end 40 of conveyor 24. This increase compensates for the increased speed of a partition 28 and cleats 62 which occurs when such components proceed around the sprocket from the upper to the lower reach of conveyor 24 at delivery end 40 and avoids striking the engaged articles with such components at this point which would occur in the absence of such speed increase. Such revolving movement while within the confines of a pocket will also rotate integral tail section 114 at the speed of the screw. Cut away portions 66 of cleats 62 are sufficiently deep to permit the tail to turn without contacting the cleat surface, while turning without recesses 66 might cause distortion of the article body if in a sufficiently pliant condition. This feature may not be necessary, however, if the material of article 144 is inherently soft and well set or if a tail portion is not present on the article at all.

Continued forward captured movement results in a gradual sequential pivoting or turning of the articles 90° downwardly after passing beyond delivery end 40 of conveyor 24 from a horizontal to a substantial vertical position by means of the rotating screw and the downwardly twisting contour of adjacent cooperating guide rail portion 54, such that on reaching rail end section 50, article 144 is in a truly vertical position as shown in FIG. 5.

With respect to FIG. 6, should brush 82 come into such unyielding contact with, for example, a side portion 83 of an article 144, as might occur when more than the design number of articles are present in one pocket 26, so as to cause bar 80 to pivot to its forwardmost extent in the direction of conveyor movement and bring extension 75 forcibly against probe 72 of switch 87, rear portion 48 of turning means 36, via actuator 86 and conventional electrical circuitry and fluid pressure will move upwardly out of cooperative relationship with screw 38 to position 90 in FIG. 8 so that subsequent articles cannot be captured within the screw channel in the manner described but rather instead remain on the conveyor. As the article-containing pocket turns downwardly to the rear toward the molding machine at end 40, such articles will be automatically dumped by gravity into a recovery zone such as a hopper 160. Such dumping action can also occur via upward displacement of rail portion 49 so as to energize switch 106 (FIG. 8) to pivot portion 48 to position 90 should, for example, an article be wedged sidewise in a pocket against sloped cleats 62 so that a ring 150 enters under the lead-in portion 49 of rail section 48 instead of the intended annular recess 153 so entering.

Referring to FIGS. 2 and 3 articles 144 may thereafter be advanced along a path between cooperating forwardly fixed 134 and moving 132 guides, the latter being another rotating screw section, to downstream station 128 which utilizes driven member(s) such as wheel 129. Should operation of such driven members be interrupted so as to shut down station 128 and screw portion 132, in the embodiment shown fixed guide 134 will substantially simultaneously move out of path-defining cooperation with guide 132 to the dump position of FIG. 3. Thereafter, further continuous advancing movement of articles 144 after such interruption and lateral displacement of member 134 will result in the articles continuously exiting the conveying path along the length where guide 134 was moved back from its cooperative position to an adjacent recovery area. In this manner, wheel machine 9, the upstream means feeding such machine with plastic (not shown) plus the takeaway system of the invention may continue to operate even though the next downstream station 128 is shut down. Subsequently, on later commencing operation of the driven members at station 128, guide 134 via acutator 136 is substantially simultaneously moved back into path-defining position in order to again commence feeding or advancing movement of the articles to station 128 for further processing.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In a method of removing blow molded thermoplastic articles from a vertically disposed wheel blow molding machine having continuously revolving mold sections containing said articles sequentially moving radially away from the wheel axis during mold opening, which method includes:
    ejecting said articles transversely downwardly out of the mold sections in a direction substantially along the plane of rotation of said sections to pockets of a takeaway conveyor;
    the improvements in said method comprising, in combination, the steps of:
        A. positioning the articles in the conveyor pockets such that an end portion protrudes laterally of one side thereof;
        B. capturing such end portions within a spiral channel of a rotating screw while the articles advance with the pockets of the moving conveyor; and then
        C. turning such captured articles sequentially downwardly to a substantially vertical position beyond the end of said conveyor by means of such rotating screw and contour of a cooperating guide rail.

2. The process of claim 1 including the step of:
    positively guiding the end portions of the articles into a position between th channel and guide rail.

3. The process of claim 2 wherein said guiding is accomplished by cammingly urging the protruding end of each article toward the channel and guide rail as each such article advances forwardly in a conveyor pocket.

4. The process of claim 1 including the steps of:
    moving a portion of said guide rail out of cooperative position with the screw in response to a predetermined condition of the articles in the pockets, whereby subsequent articles are not captured within said channel but remain on said conveyor; and then
    dumping said subsequent articles from said pocket into a recovery zone at the end of the conveyor.

5. The process of claim 1 wherein the articles are at an average overall elevated temperature on ejection from the mold sections so as to be susceptible to surface deformation on striking.

6. The process of claim 1 wherein the end portions comprise integral waste moil sections.

7. The process of claim 1 further including the steps of:
    advancing articles issuing from said screw along a path between cooperating fixed and moving guides to a downstream station using driven members;
    interrupting operation of said members while substantially simultaneously moving one of the guides out of path-defining cooperation with the other guide;
    continuing said advancing from said screw after said interruption whereby articles continuously exit said path to an adjacent recovery area where said one guide was moved out of cooperating position.

8. The process of claim 7 including the step of:
    later commencing operation of said members after said interruption without ever interrupting rotary movement of the screw while substantially simultaneously moving said one guide back into path-defining position to again commence said advancing movement to the driven members of the downstream station.

9. The process of claim 1 including the step of:
    increasing the linear advancing speed of the captured articles before turning downwardly to the substantially vertical position.

10. The process of claim 1 wherein said articles are turned substantially 90° (during step C), and including the step of thereafter advancing the thus turned articles forwardly without any such further orbital turning.

* * * * *